United States Patent [19]

Denniston

[11] 4,372,507
[45] Feb. 8, 1983

[54] SELECTIVELY ACTUATED FLIGHT SIMULATION SYSTEM FOR TRAINER AIRCRAFT

[75] Inventor: James L. Denniston, Columbus, Ohio

[73] Assignee: Rockwell International Corporation, El Segundo, Calif.

[21] Appl. No.: 773,632

[22] Filed: Mar. 2, 1977

[51] Int. Cl.³ .............................................. B64C 9/32
[52] U.S. Cl. .................................. 244/113; 244/203; 244/213
[58] Field of Search ................... 244/113, 110 D, 203, 244/181, 183, 186, 213

[56] References Cited

U.S. PATENT DOCUMENTS

| | | | |
|---|---|---|---|
| 2,005,965 | 6/1935 | Barnhardt | 244/113 X |
| 2,239,854 | 4/1941 | McCormick | 244/113 |
| 2,344,945 | 3/1944 | Knox et al. | 244/113 X |
| 2,381,957 | 8/1945 | Ibarra | 244/113 |
| 2,744,173 | 5/1956 | Grosse-Lohmann | 244/113 X |
| 2,943,823 | 7/1960 | Mullins et al. | 244/181 |
| 3,480,040 | 8/1949 | Mitchell | 244/113 X |
| 3,589,648 | 6/1971 | Gorham et al. | 244/186 |
| 3,945,593 | 3/1976 | Schanzer | 244/181 |

FOREIGN PATENT DOCUMENTS

| | | | |
|---|---|---|---|
| 740080 | 10/1943 | Fed. Rep. of Germany | 244/113 |
| 55961 | 3/1944 | Netherlands | 244/113 |

*Primary Examiner*—Galen L. Barefoot
*Attorney, Agent, or Firm*—Charles T. Silberberg

[57] ABSTRACT

This invention generally concerns an aircraft useful for training pilots, and specifically involves providing a trainer aircraft having high to moderate aspect ratio wings with selectively operable design features that impart to the trainer aircraft the handling characteristics of a high performance, swept wing aircraft in an approach and landing configuration. In particular, the high performance swept wing aircraft characteristics are preferably imparted by selectively actuated primary and secondary speed brake mechanisms. Optimally, the primary speed brake mechanism is positioned as a function of angle of attack of the aircraft.

8 Claims, 7 Drawing Figures

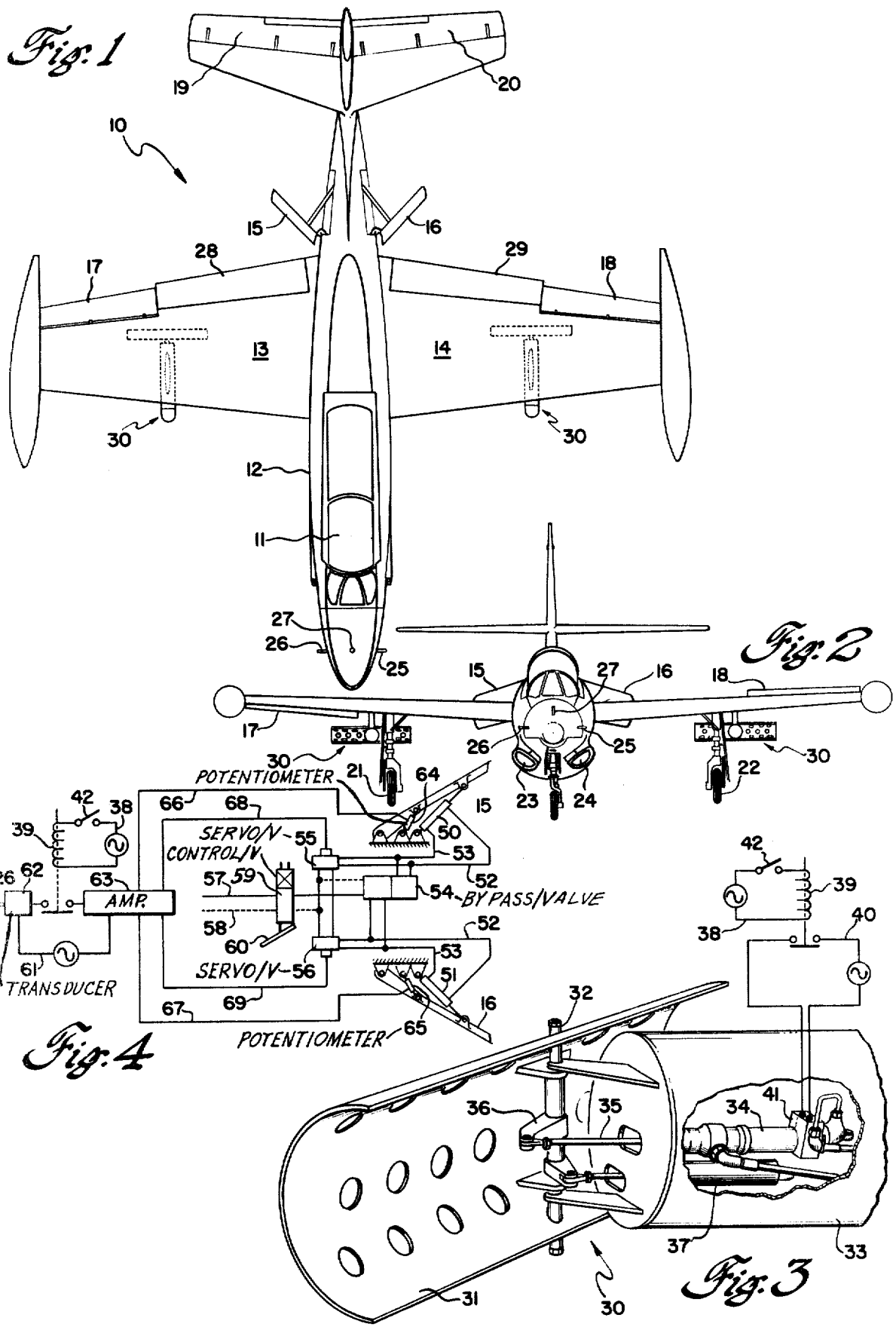

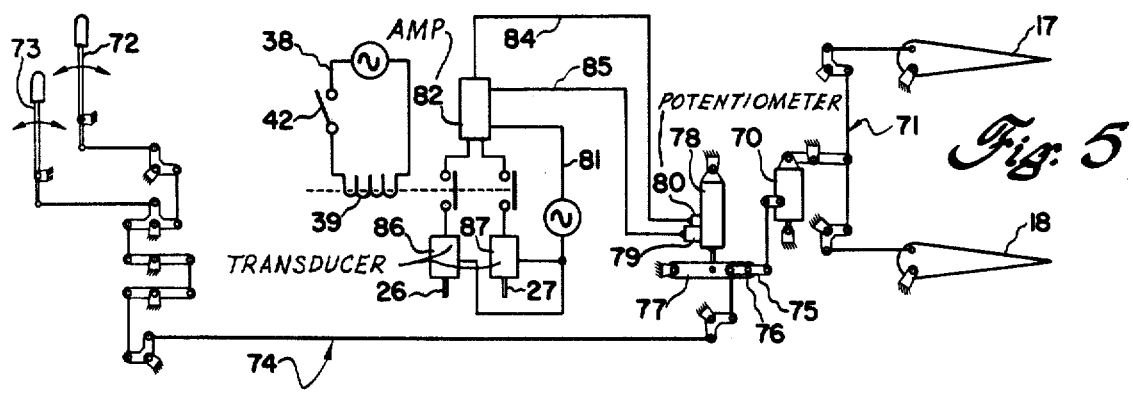
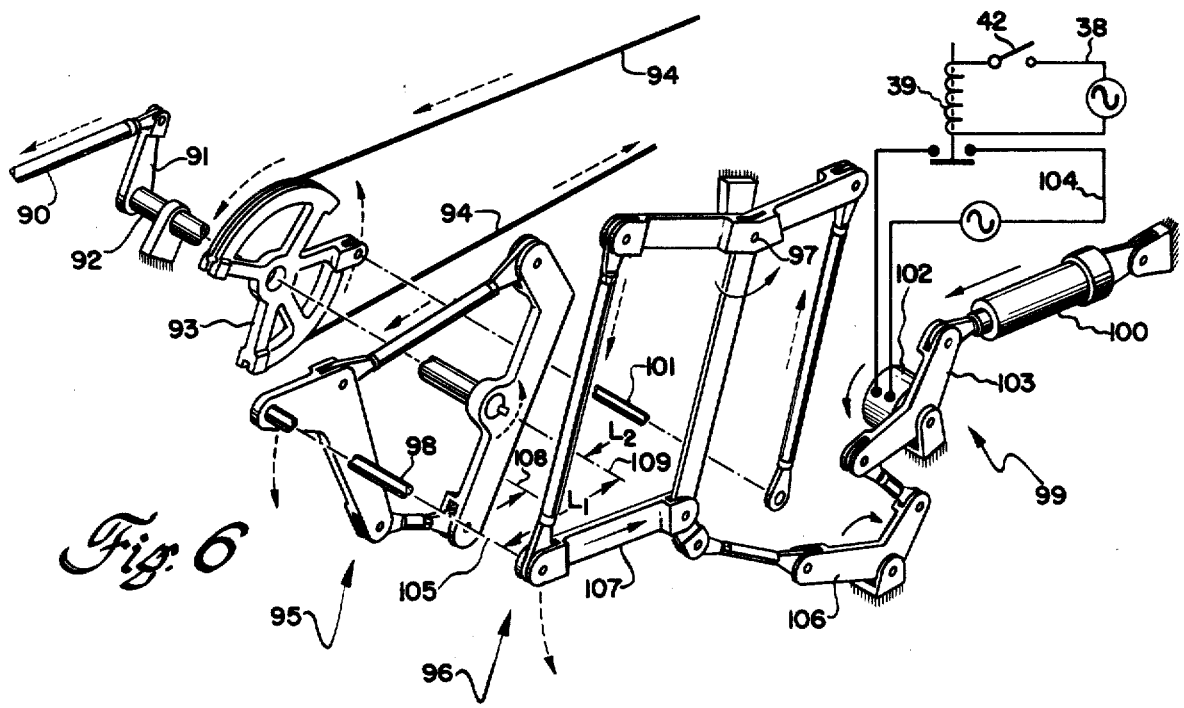
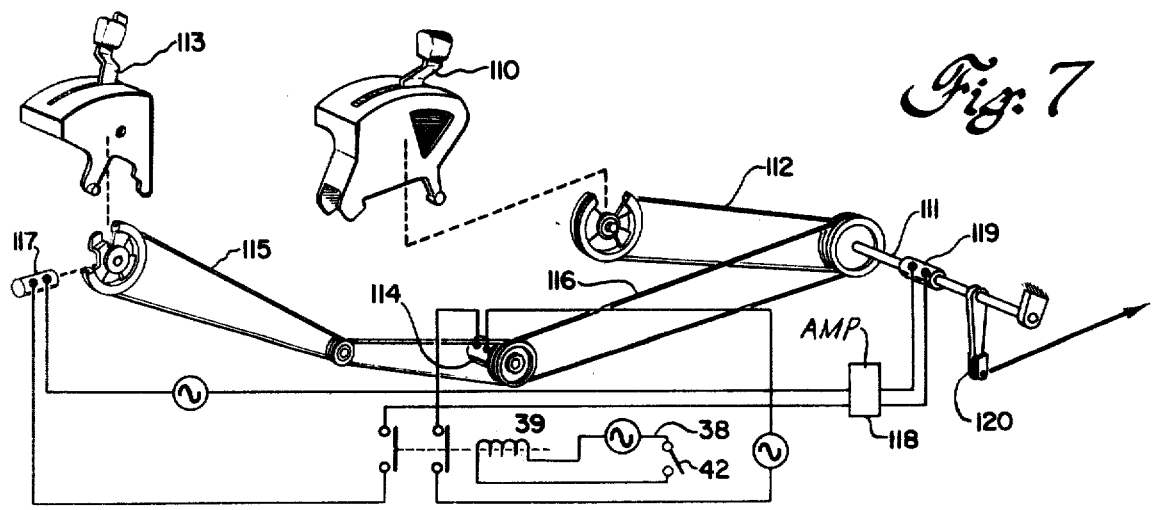

SELECTIVELY ACTUATED FLIGHT SIMULATION SYSTEM FOR TRAINER AIRCRAFT

SUMMARY OF THE INVENTION

An otherwise conventional trainer aircraft having a crew compartment for an instructor and a student pilot and having wings of high to moderate aspect ratio is provided with combined functional features that may be selectively actuated to downwardly extend the aircraft glide slope range obtainable with engine power control, to obtain improved aircraft sink rate control response to engine power changes under high angle of attack and increased airspeed conditions, including engine power changes under engine backside of power curve operating conditions, to obtain aircraft roll response to detect approach/landing sideslip conditions and yawing conditions, and to obtain reduced aircraft longitudinal flight control sensitivity to pilot commands. More specifically, the conventional trainer aircraft is provided with a secondary speed brake means which is selectively actuated during aircraft approach and landing operations along with a primary speed brake means to increase aircraft drag and thereby downwardly extend the range of glide slope control obtainable by aircraft engine power variation at a given airspeed. The aircraft also is provided with an aircraft angle of attack sensor that is arranged to modulate the position of the aircraft primary speed brake means as a function of aircraft angle of attack thereby enabling the aircraft to be controlled in sink rate by power variations under high airspeed and high aircraft angle of attack conditions representative of the conditions encountered in high performance swept wing aircraft during approach and landing operations. Further, the novel aircraft of this invention incorporates combined angle of attack and sideslip sensors which function to control the positioning of conventional aircraft ailerons to impart increased roll moments to the aircraft in its approach and landing configuration in response to detected sideslip or yawed flight conditions. Also, the aircraft of this invention incorporates a novel ratio changer in its longitudinal (pitch) control system to significantly reduce the gain of the aircraft normal longitudinal flight control system and thereby reduce the sensitivity of the aircraft to pilot longitudinal correction commands in the approach/landing configuration. Lastly, if desired, the aircraft may incorporate a selectively operable throttle servo mechanism that may be selectively actuated to delay the thrust response of a jet-type engine to power throttle changes to correspond to the thrust response of a fan-type turbo-jet engine to the same magnitude of engine power throttle change.

DESCRIPTION OF THE DRAWINGS

FIGS. 1 and 2 are plan and front elevational views, respectively, of a trainer aircraft embodying the features of this invention and having an aircraft approach and landing configuration;

FIG. 3 is a perspective and simplified schematic illustration of a secondary speed brake means incorporated into the aircraft of FIGS. 1 and 2;

FIG. 4 is a simplified electrical and mechanical schematic illustration of a primary speed brake control arrangement incorporated into the aircraft of FIGS. 1 and 2;

FIG. 5 is a simplified electrical and mechanical schematic illustration of a lateral flight control system modification incorporated into the aircraft of FIGS. 1 and 2 to obtain a dihedral effects capability;

FIG. 6 is an exploded perspective view of a longitudinal flight control system ratio changer incorporated into the aircraft of FIGS. 1 and 2; and FIG. 7 is a simplified electrical and mechanical optional engine power throttle linkage modification incorporated in the aircraft of FIGS. 1 and 2.

DETAILED DESCRIPTION

FIGS. 1 and 2 in the drawings illustrate a trainer aircraft 10 having a crew compartment 11 within fuselage 12 for occupancy by an instructor and by a student pilot. Aircraft 10 also includes wings 13 and 14 which are of conventional aerodynamic profile and which are characterized as having a high to medium aspect ratio (e.g., 6) as distinguished from the relatively low aspect ratio of the wings of a high performance, swept wing type aircraft (e.g., 4.5). Also incorporated into aircraft 10 are the deployed primary speed brakes 15,16, actuated lateral flight control system aileron surfaces 17,18, and longitudinal flight control system elevator surfaces 19,20. FIG. 2, in particular, illustrates the conventional landing gear assemblies 21,22 incorporated into aircraft 10, the inlets 23,24 for the aircraft jet engine, and conventional flight sensors 25 through 27 whose functions are described later in greater detail. Aircraft 10 also is provided with conventional flap members 28,29 for selective actuation to increase wing aerodynamic lift with additional drag during training take-off and landing operations, as desired.

FIG. 3 discloses details of a preferred secondary speed brake means 30 which is selectively actuated during aircraft approach and landing operations to downwardly extend the range of glide slope control obtainable by aircraft 10 through engine power variation at increased airspeeds. Each assembly 30 installed in aircraft 10 is positioned symmetrically with respect to the other about the aircraft longitudinal center line. For normal approach and landing operations of trainer aircraft 10 primary speed brake members 15,16 are deployed along with flap members 28,29 to properly decrease aircraft speed and obtain a satisfactory range of glide slope control by power variation for the student pilot. However, to obtain a desired capability for glide slope control in aircraft 10 by engine power adjustment at a greater rate of aircraft descent and at high airspeeds, flap members 28,29 are not actuated but assemblies 30 are.

Each secondary speed brake means 30 in aircraft 10 is basically comprised of a semi-cylindrical perforated drag plate member 31 mounted by hinge means 32 to a pylon-supported cylindrical pod body 33. Each assembly 30 is supported from its respective wing (13,14) with assured clearance relative to other aircraft operating components such as the landing gear, ailerons, and flaps. An electrically controlled hydraulic actuator 34 positioned within pod body 33 is connected to drag plate 31 in powering relation by actuator rod 35 and by the hinge lever arm designated 36. In its retracted position drag plate 31 is stowed in a semi-flush position generally parallel to and against pod body 33. In that stowed position a conventional over-center mechanical latch mechanism (not shown) functions against bungee 37 to positively maintain the drag plate from deployment by aerodynamic forces. An electrical actuation circuit 38 functionally coupled through relay 39 and power control circuit 40 to the valve member 41 of actuator 34 controls the actuation of drag plate member 31 to an open condition. In the open condition the concave surface of drag plate member 31 is positioned at right angles to the aircraft direction of flight. Hinge 32 is positioned in an off-center relation relative to drag plate 31 in order that the drag plate be returned to its stowed condition by aerodynamic forces either in the event of intentional opening of pilot-operated switch 42 or in the event of hydraulic or electrical failure. In one actual aircraft embodiment incorporating a secondary speed brake assembly 30 at each wing, an actuation of such assemblies to their fully opened condition at an indicated air speed of 135 knots was effective to reduce the aircraft glide slope range minimum angle from −8° to −12° for a given engine power level.

In order to provide an approach/landing handling characteristic simulating the performance of a swept wing aircraft operating at the back side of its glide slope engine power curve, aircraft 10 is provided with the novel drag modulation means disclosed in FIG. 4 of the drawings. Primary speed brake members 15,16 are powered by conventional bi-directional hyraulic actuators 50 and 51. Hydraulic lines 52 and 53 connect such actuators respectively to conventional dual pressure operated hydraulic bypass valve 54 and to conventional hydraulic control servo valves 55 and 56. Actuators 50 and 51 are also connected indirectly to hydraulic supply and return lines 57 and 58 of a conventional aircraft high pressure hydraulic system through the electrically actuated control valve 59 having a manual pressure dump feature designated 60. During the normal operation of trainer aircraft 10 in its basic configuration, valve member 59 and the manifolding feature of bypass valve 54 function without any operation of servo valves 55 and 56 to control opening and closing of speed brake members 15,16 by operation of actuators 50 and 51.

The FIG. 4 arrangement further includes a power control circuit 61, illustrated in simplified electrical schematic form, which regulates the operation of actuators 50,51 through the operation of control servo valves 55 and 56. Power control circuit 61 may be actuated by a circuit identical or similar to electrical actuation circuit 38 of FIG. 3 in the manner shown. Power control circuit 61 includes a conventional angle of attack sensor probe 26 having a cooperating angle of attack transducer element 62 which provides a command input signal to amplifier assembly 63. Amplifier assembly 63 incorporates a conventional summing circuit that receives inputs from position feedback potentiometers 64,65 through signal conductors 66 and 67 and that provides command output signals to servo valves 55,56 through the signal conductors designated 68 and 69. In one actual embodiment of the FIG. 4 arrangement amplifier 63 was designed to function in a manner whereby primary speed brake members 15,16 were opened approximately 10° from their basic closed position upon operation of switch 42 in actuation circuit 38. Superimposed upon the basic open position was the drag modulation accomplished by control circuit 61. Specifically, amplifier 63 was programmed to extend each speed brake member 15,16 throughout an additional range of 40° from the 10° position linearly as a function of aircraft angle of attack conditions detected by sensor 26 over the angle of attack range of 12° to 16°. Operation of trainer aircraft 10 through circuits 38 and 61 induced the aircraft handling characteristic which requires the pilot to add engine power concurrent with a reduction of aircraft airspeed during approach/landing operations.

Swept wing aircraft are generally characterized by an effective dihedral that varies with aircraft angle of attack and as a consequence cross-winds and yawed conditions have a more pronounced adverse effect on aircraft lateral control in swept wing aircraft in their approach and landing operation in comparison to aircraft having relatively high to moderate wing aspect ratios. In order to provide trainer aircraft 10 with handling characteristics in cross-wind and yawed conditions comparable to that which a pilot experiences in approach/landing operation of a swept wing airplane, for instance, it is necessary to provide a lateral flight control system that functions similarly to the lateral flight control system illustrated schematically in FIG. 5.

The FIG. 5 control arrangement is basically a conventional aircraft lateral flight control system with additional design features which produce commands to the aircraft aileron control surfaces 17,18 independent of pilot control. Surfaces 17,18 are powered by hydraulic servo actuator 70 through the interconnecting linkage designated generally as 71. Linkage 71 typically is comprised of various pivot supports, bellcranks, push-pull rods, sector pulleys, cables, and the like as appropriate to a particular aircraft installation. Movement of actuator 70 in a given direction causes the simultaneous rotation of control surfaces 17,18 in opposite directions relative to each other. Instructor and student command inputs to servo hydraulic valve 70 are introduced through the conventional control sticks designated 72,73 and the interconnecting linkage 74 constructed in the manner of linkage 71.

In order to provide for the mixing of aileron command signals developed for obtaining the dihedral effects capability, the lateral control system linkage illustrated in FIG. 5 is further provided with a mixer bar 75 having a pivotal support 76 on pivoted carrier bar 77. Carrier bar 77 is powered or rotated about its airframe axis of rotation by hydraulic actuator 78 having an electrically operated bi-directional hydraulic valve 79 and a feedback potentiometer 80. Electrical power control circuit 81 functions to couple amplifier 82 to angle of attack sensor 26 and sideslip sensor 27 and their respective transducers 86,87. Amplifier 82 also is coupled to hydraulic valve 79 and feedback potentiometer 80 by signal conductors 84, 85. An electrical actuation control circuit 38 similar in function to the actuation circuits illustrated schematically in FIGS. 3 and 4 is provided in the FIG. 5 arrangement for selective actuation of power control circuit 81 and its actuator 78.

Amplifier 82 functions in part to combine the input commands received from transducers 86, 87 and also incorporates a summing circuit. The outputs of transducers 86, 87 are combined in amplifier 82 to cause series hydraulic actuator 78, in cooperation with elements 70, 71, and 75 through 77 to drive the up-wind aileron of aileron pair 17, 18 in a downward direction. The amount of aileron deflection produced by detected sideslip is also varied with angle of attack producing the desired dihedral effect. In one actual embodiment of the FIG. 5 system sensors 26 and 27 operating throughout an effective angle of attack range of 12° to 16° and throughout a sideslip and yawed condition range equivalent to 5° yawed attitude to each side of the aircraft direction of flight functioned to reposition aileron surfaces 17, 18 during flight to thereby require the student or instructor to develop equivalent control correction or compensation. Pilot evaluation of the FIG. 5 arrangement indicated that the obtained apparent dihedral effect was at a level during approach and landing operations that was typical of that experienced in aircraft having a swept wing aspect ratio of approximately 4.5 even though the incorporating trainer aircraft had a wing aspect ratio of approximately 6.

Since representative high performance swept wing aircraft have a type of longitudinal flight control system characterized by large stick travel and low force gradients to avoid oversensitivity in high speed and high dynamic pressure flight regimes, it is necessary to provide an error-forgiving trainer aircraft longitudinal flight control system with an alternate capability if it is to simulate the longitudinal handling characteristics of a high performance swept wing aircraft in the aircraft approach and landing configuration. A preferred manner for achieving that alternate capability involves the installation of a selectively operable gearing ratio changer in the aircraft longitudinal flight control system in the manner shown in FIG. 6.

In a conventional longitudinal control scheme of the type with which the FIG. 6 arrangement is concerned, and in the absence of the alternate capability, pilot-originated pitch command signals introduced mechanically at push-pull rod 90 would likely be transmitted through lever arm 91 and shaft 92 directly to sector pulley 93 and cable 94 for routing to the hydraulic actuators for the aircraft elevator surfaces 19, 20. However, in the FIG. 6 arrangement sector pulley 93 is instead arranged to rotate freely on shaft 92 and a gear ratio changer mechanism is essentially coupled to the shaft for selective operation to change the travel and force relationships which exist as between rod 90 and cable 94. Such gearing ratio changer mechanism is basically comprised of a four-bar linkage 95 that is keyed or otherwise fixedly connected to shaft 92, a transfer mechanism 96 that is supported from the airframe at pivot 97 and functionally pivotally coupled to four-bar linkage 95 by pin 98, and a selectively operable actuating mechanism 99 that couples transfer mechanism 96 to the flight control system conventional return bungee designated 100. Transfer mechanism 96 also is pivotally connected to the attach clevis on sector pulley 93 by the pin designated 101.

A critical element of actuation linkage 99 is the airframe-supported conventional electrical rotary actuator and clutch assembly 102 which is connected to bellcrank 103 in driving relation. The clutch mechanism between the output shaft of actuator 102 and bellcrank 103 is characterized in that it is disengaged (free) except when electrical power is applied to assembly 102 in which case the clutch becomes engaged or locked. Electrical power control circuit 104 cooperates with assembly 102 and in turn is controlled by electrical actuation control circuit 38. Circuit 38 may be identical in construction and function to the similar actuation control circuits illustrated in FIGS. 3 through 5.

The ratio changer condition illustrated in FIG. 6 in exploded relation is typical of the condition for normal trainer aircraft operation in which a moment arm $L_1$ is established as between the axis 109 of command signal input to shaft 92 and the axis 105 of the application of control force to transfer mechanism 96. When switch 42 is closed to actuate power circuit 104 and actuator-clutch 102, the actuator-clutch rotates bellcrank 103 and extends the rod of return bungee 100 thereby compressing an internal bungee spring. Bellcrank 106 is rotated and lower bar 107 of transfer mechanism 97 is translated, each in the direction indicated by the accompanying solid line arrow. Concurrently the point of force application at line 105 is moved transversely to line 108 so that the new control force moment arm becomes a fraction of the initial control force moment arm. The new reduced moment arm that is so-developed is designated $L_2$ in FIG. 6. Accordingly, whenever a control force is applied to rod 90 in the alternate condition, the output applied to the lug of sector pulley 93 through pin 101 is at a reduced moment arm and increased force.

In some instances it may be desirable to provide trainer aircraft 10, if it is powered by a conventional jet engine, with the engine thrust response characteristics of a turbo fan engine. An arrangement for accomplishing that objective is illustrated schematically in FIG. 7. The instructor engine throttle control lever 110 in aircraft 10 is mechanically coupled to engine power control shaft 111 directly through the disclosed linkage and pulley/cable mechanism generally designated 112. Student engine throttle control lever 113 also is connected mechanically to engine power control shaft 111 by a linkage and pulley/cable combination except that an electrically actuated centering clutch 114 is provided functionally intermediate the cables 115 and 116 and functions on actuation to mechanically disengage lever 113 from a direct connection to shaft 111. In normal operation engine throttle levers 110 and 113 have equal authority over engine power control shaft 111 since centering clutch 114 is engaged to thereby couple cable segments 115 and 116 in a continuous driven relation. In the event it becomes desirable to change the aircraft 10 engine thrust response characteristics from that of a jet aircraft to that of an aircraft with a turbo fan engine for the purpose of student training, it is necessary to actuate switch 42 of electrical actuation circuit 38. Position transducer 117 which is mechanically linked to engine throttle control lever 113 then develops a command signal that is inputted to amplifier 118. A limited torque electrical rotary servo 119 is installed in shaft 111 intermediate the attached lever arm 120 and the pulleys driven by cables 112 and 116. Limited torque servo 119 is controlled by the output of amplifier 118 having a gain characteristic that adds a time lag to the engine thrust response normally commanded by engine throttle lever 113. In the event the instructor elects to override the engine performance controlled by lever 113 he may do so directly by operation of engine throttle lever 110 since it has authority over servo 119 and the command inputted from engine throttle control lever 113. On the opening of switch 42 (FIG. 7) the engine control system is returned to its normal trainer aircraft configuration.

The simplified electrical schematic illustrations provided in the drawings are not intended to show the only method for actuating the FIGS. 3–7 systems for the development of swept wing aircraft handling characteristics in aircraft 10. In one alternate arrangement, for instance, a master circuit may be provided for simultaneously actuating all installed systems and such would utilize master switches in the aircraft control sticks 72,73 that would be operable by either the instructor or student to immediately deactivate all of the installed systems to return aircraft 10 to its basic configuration with trainer aircraft handling characteristics. The individual actuation circuits 38 when installed in aircraft 10 permit selective actuation/deactivation of a particular system at the election of the instructor or pilot.

I claim:

1. In a trainer aircraft having a fuselage and fixed wings, in combination:
   (a) parasite drag means comprising selectively actuated primary speed brake means and selectively actuated secondary speed brake means, said primary and secondary speed brake means each increasing the drag on said aircraft without changing the aerodynamic lift of said wings when actuated, said secondary speed brake means being supported by said fixed wings, said secondary speed brake means including a drag plate member that is movable between a faired position and an actuated position, said drag plate member having a longitudinal axis that is parallel to the flight direction of said trainer aircraft when faired and that is at right angles to said flight direction when actuated, said drag plate member being hingedly mounted and powered to said actuated position, said drag plate member being hingedly mounted aerodynamically off-center when in said actuated position such that said drag plate member will be returned to said faired position by aerodynamic forces when unactuated; and
   (b) control means for selectively actuating said secondary speed brake means independently of said primary speed brake means.

2. The invention as defined in claim 1 wherein said primary speed brake means is movable from a faired position to an initial open position, and from said initial open position to a full open position and also including:
   (c) actuator means connected in moving relation to said primary speed brake means;
   (d) angle of attack sensor means; and
   (e) secondary control means connected to said actuator means responsive to said angle of attack sensor means for modulating through said actuator means the position of said primary speed brake means from said faired position to said initial open position as a step function and in the range of said initial open position to said full open position as a function of the angle of attack of said trainer aircraft.

3. In a trainer aircraft having a fuselage and fixed wings, in combination:
   (a) parasite drag means comprising selectively actuated primary speed brake means and selectively actuated secondary speed brake means, said primary and secondary speed brake means each increasing the drag on said aircraft without changing the aerodynamic lift of said wings when actuated, said secondary speed brake means being mounted to said fixed wings, said secondary speed brake means including a drag plate member that is movable between a faired position and an actuated position, said drag plate member having a longitudinal axis that is parallel to the flight direction of said trainer aircraft when faired and that is at right angles to said flight direction when actuated, said drag plate member being hingedly mounted and powered to said actuated position, said drag plate member being hingedly mounted aerodynamically off-center when in said actuated position such that said drag plate member will be returned to said faired position by aerodynamic forces when unactuated; and
   (b) control means for selectively actuating said secondary speed brake means independently of said primary speed brake means.

4. The invention defined by claim 3 wherein said drag plate member is hingedly mounted about an axis substantially perpendicular to said fixed wings.

5. In a trainer aircraft, in combination:
   (a) speed brake means, said speed brake means being movable from a faired position to a uniform stationary initial open position, and from said initial open position to a full open position;
   (b) actuator means connected in moving relation to said speed brake means;
   (c) angle of attack sensor means; and
   (d) control means connected to said actuator means responsive to said angle of attack sensor means for modulating through said actuator means the position of said speed brake means from said faired position to said initial open position as a step function and in the range of said initial open position to said full open position as a function of the angle of attack of said trainer aircraft, said speed brake means being rotated approximately 10° from said faired position to said initial open position, and approximately an additional 40° from said initial open position to said full open position, said speed brake means being modulated over said range of said initial open position to said full open position through a range of approximately 5° sensed by said angle of attack sensor means.

6. The invention as defined by claim 5 wherein said control means modulates the position of said speed brake means from said initial open position to said full open position proportional to the angle of attack of said trainer aircraft.

7. In a trainer aircraft having a fuselage and fixed wings, in combination:
   (a) parasite drag means comprising selectively actuated primary speed brake means mounted to said fuselage, and selectively actuated secondary speed brake means, said primary and secondary speed brake means each increasing the drag on said aircraft without changing the aerodynamic lift of said wings when actuated, said primary speed brake means being movable from the faired position to an initial open position, and from said initial open position to a full open position;
   (b) control means for selectively actuating said secondary speed brake means independently of said primary speed brake means;
   (c) actuator means connected in moving relation to said primary speed brake means;
   (d) angle of attack sensor means; and
   (e) secondary control means connected to said actuator means responsive to said angle of attack sensor means for modulating through said actuator means the position of said primary speed brake means from said faired position to said initial open position as a step function and in the range of said initial open position to said full open position as a function of the angle of attack of said trainer aircraft.

8. In a trainer aircraft, in combination:
   (a) speed brake means, said speed brake means being movable from a faired position to a uniform stationary initial open position, and from said initial open position to a full open position;
   (b) actuator means connected in moving relation to said speed brake means;
   (c) angle of attack sensor means; and
   (d) control means connected to said actuator means responsive solely to said angle of attack sensor means for modulating through said actuator means the position of said speed brake means from said faired position to said initial open position as a step function, and in the range of said initial open position to said full open position solely as a function of the angle of attack of said trainer aircraft.

* * * * *